May 13, 1941.  C. E. HERRSTROM ET AL  2,241,856
MANUFACTURE OF RUBBER THREAD OR THE LIKE
Original Filed Nov. 18, 1935   3 Sheets-Sheet 1
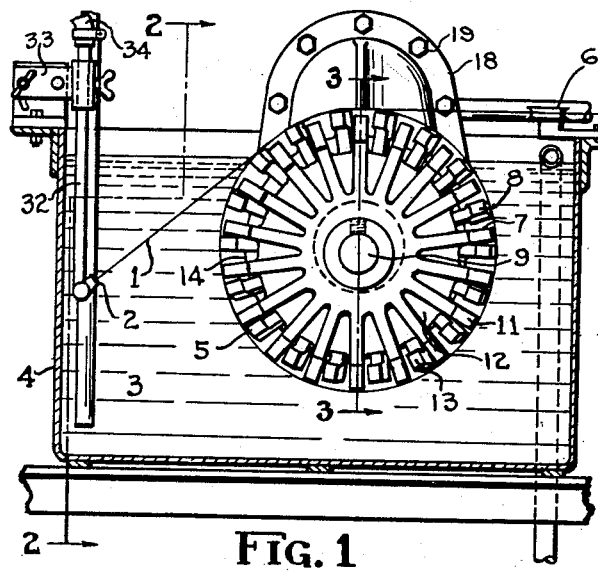
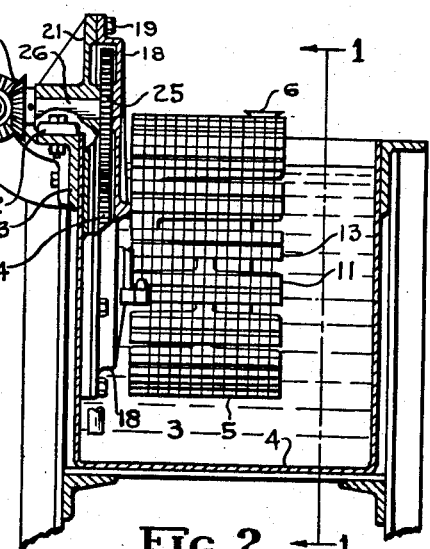
INVENTORS
CHARLES E. HERRSTROM
BY FRED J. SAMERDYKE
Charles E Herrstrom
ATTORNEY

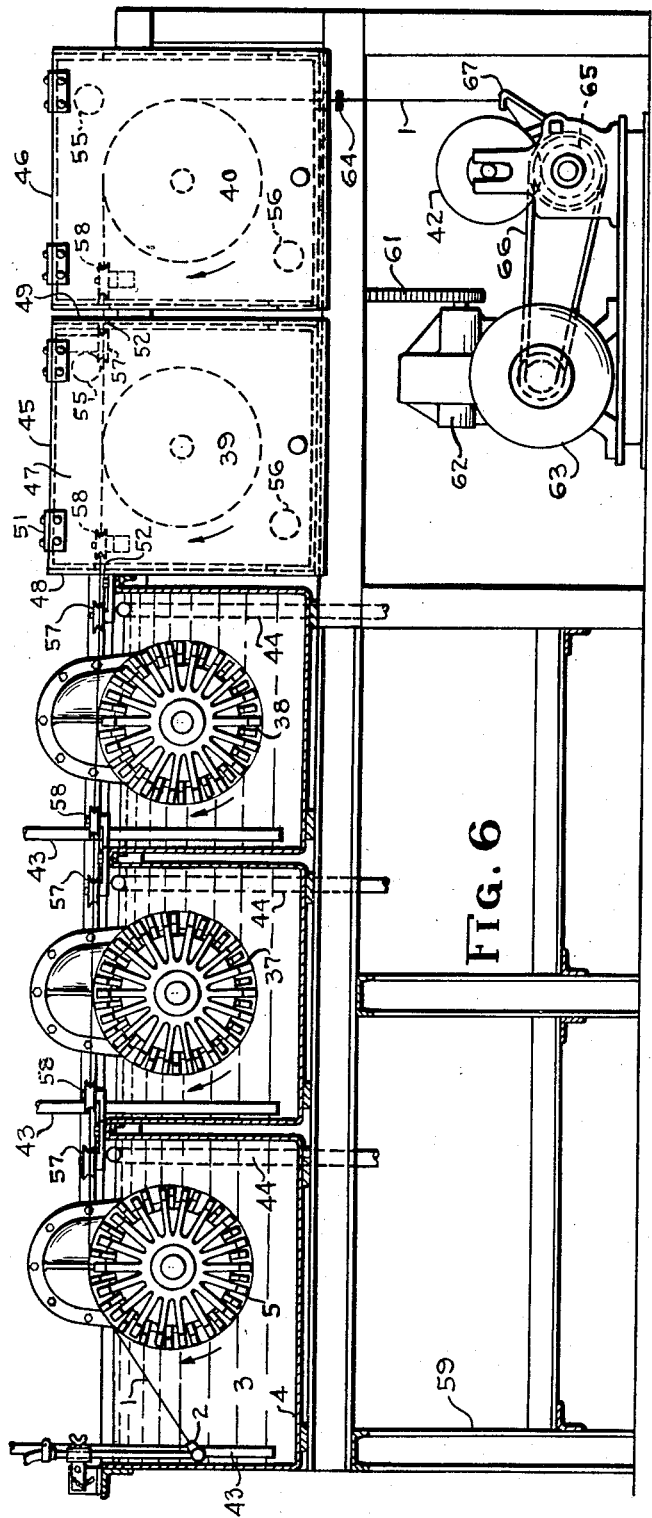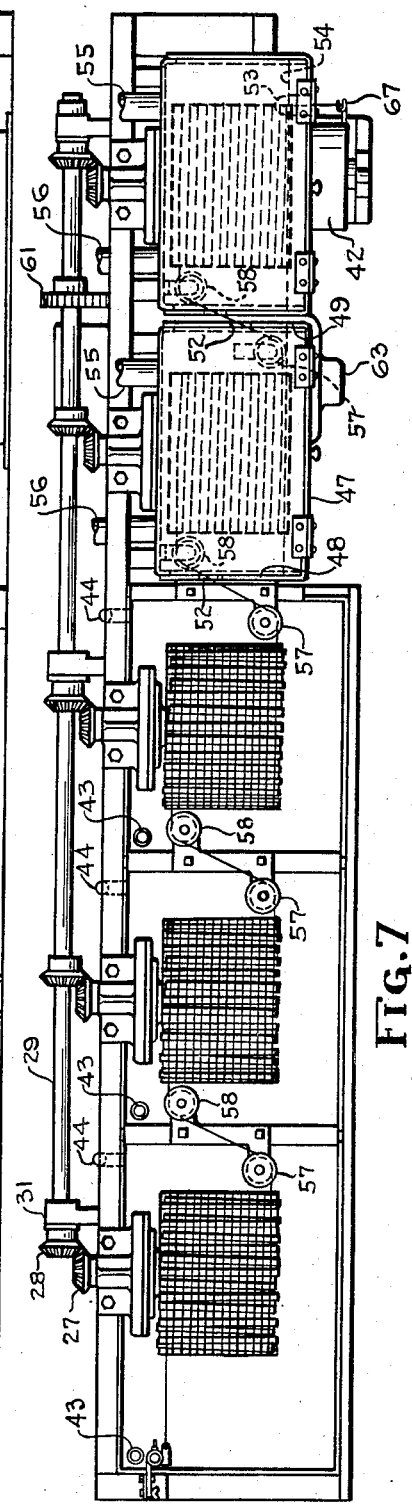

May 13, 1941.   C. E. HERRSTROM ET AL   2,241,856
MANUFACTURE OF RUBBER THREAD OR THE LIKE
Original Filed Nov. 18, 1935   3 Sheets-Sheet 3
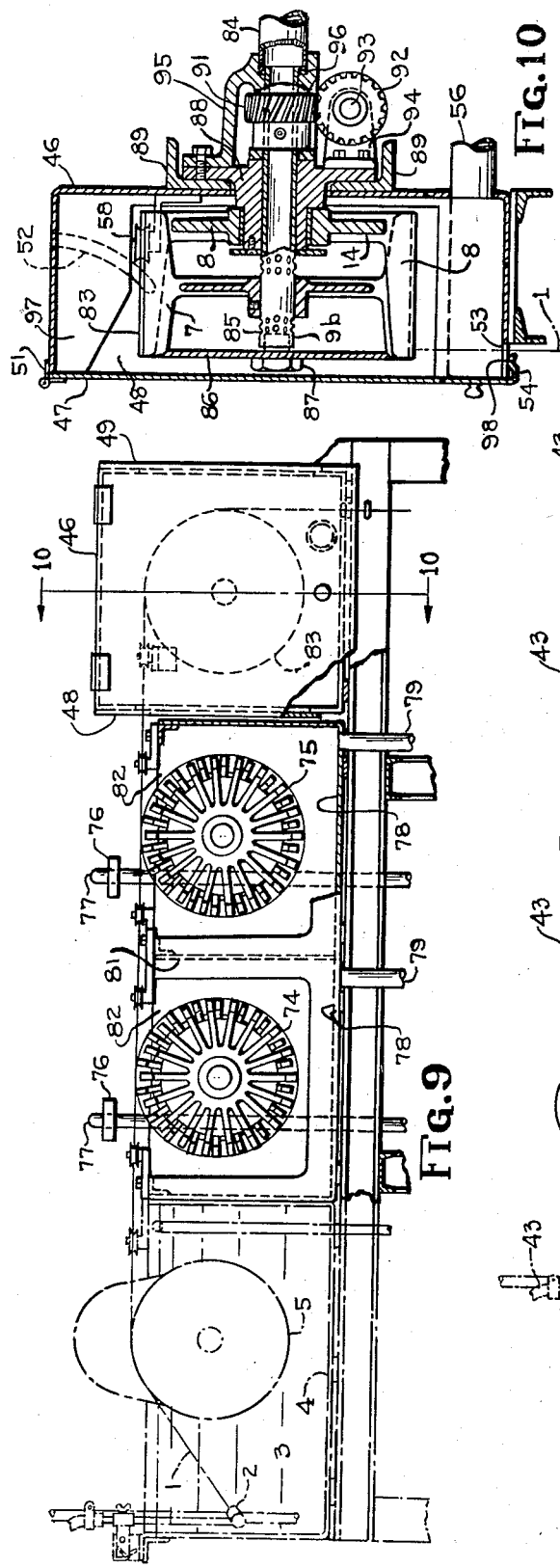
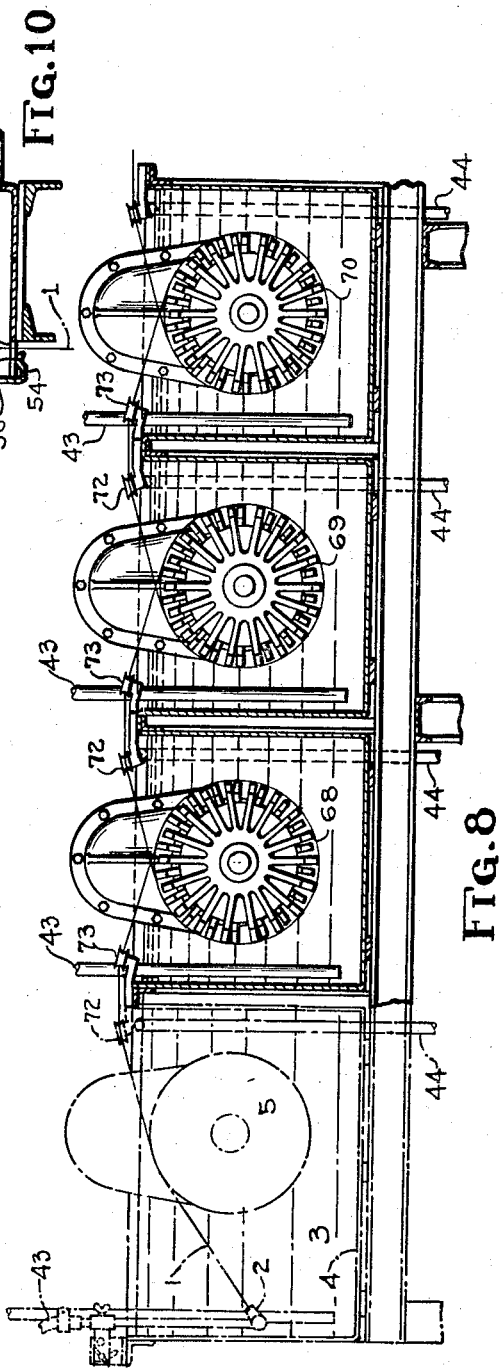
INVENTORS
CHARLES E. HERRSTROM
BY FRED J. SAMERDYKE
Charles E Herrstrom
ATTORNEY Patented May 13, 1941

2,241,856

UNITED STATES PATENT OFFICE 2,241,856

MANUFACTURE OF RUBBER THREAD OR THE LIKE

Charles E. Herrstrom, Lakewood, and Fred J. Samerdyke, Rocky River, Ohio, assignors to Industrial Rayon Corporation, Cleveland, Ohio, a corporation of Delaware Application November 18, 1935, Serial No. 50,292
Renewed July 19, 1939

9 Claims. (Cl. 18—54)

This invention relates to methods of and apparatus for manufacturing threads, strips, tapes, bands, tubes and like articles, hereinafter referred to as thread or the like, of rubber or similar materials.

In manufacturing rubber thread or the like according to the method commonly employed, the thread or the like is produced by extruding a dispersion of rubber in a liquid vehicle into a suitable coagulating bath. The resulting thread or the like is passed through any other bath or baths to the action of which it may be desired to subject the thread or the like, as, for example, baths for performing such processing operations as dehydrating, hardening, applying accelerators, etc. The thread or the like is then dried or vulcanized or both. Vulcanization is accomplished in any one of several ways: the thread or the like may, for example, be vulcanized while being dried, it may be vulcanized after being dried, or it may be vulcanized under water, as may in any given case be expedient. Various modifications of these processes may be used; for instance, the thread or the like may, if desired, be produced from a rubber solvent solution which coagulates upon drying in air, in which case the usual coagulating bath is not required.

In the manufacture of rubber thread or the like according to these and similar methods, long periods of time are required for performing the various processing treatments. This is ordinarily provided for by making the treating baths or chambers, as, for example, the coagulating bath, relatively long and by drawing the thread or the like therethrough at low speeds generally ranging from about 30 to about 40 ft. per minute. Consequently, production speed is low, a large amount of floor space is required, and, if the baths are superposed one above the other, in an effort to save floor space, complications in construction and difficulties in operating result. Likewise, since the concentration, temperature, etc. of the processing reagents are often of importance, it is desirable to obtain accurate control over such characteristics, which has heretofore been found difficult because of the long baths used, with their consequent large quantities of processing reagents and large radiating surfaces.

Another difficulty often arises in connection with supporting or conveying the rubber thread or the like through the baths, because of the length of said baths and the consequent tension imposed on the long length of thread or the like as it is drawn through them. It has been proposed to provide conveyors in the baths to support the rubber thread or the like, but complication of construction results. The rubber thread or the like is usually supported on guides or rollers as it travels through each bath, but often the excessive tension induced by friction results in effects detrimental to the thread or the like, especially in the coagulating bath. As will hereinafter appear, the present invention eliminates these difficulties.

Briefly, the invention comprises continuously but temporarily storing the rubber thread or the like, preferably in the form of one or more traveling helices, and, while it is thus stored, applying to the thread or the like appropriate processing treatment. By means of suitable thread-storage devices on which the rubber thread or the like is continuously stored, considerable thread or the like may be processed in a relatively small area with consequent economy of floor space, greater ease of access, opportunity for more of the processing operation or operations, as well as other advantages. Obviously, the invention may assume any one of a large number of widely varying forms of which only a very few can be specifically described herein. For purposes of illustration, but in no sense of limitation, the invention will be shown and described as applied, in a limited number of embodiments thereof, to the manufacture of rubber thread from an aqueous dispersion of rubber such, for example, as latex.

In the drawings, in which like reference characters refer to like parts throughout, Figure 1 is an elevation from line 1—1 of Figure 2 of one embodiment of the invention as employed in the coagulation of rubber thread; Figure 2 is an elevation, with parts in section, from the line 2—2 of Figure 1; Figure 3 is an enlarged view of one form of thread-storage, thread-advancing device which may be used in the practice of the invention, parts being shown in elevation and other parts in section; Figure 4 is an elevation from line 4—4 of Figure 5 of another embodiment of the invention comprising a thread-storage, thread-advancing device, also disposed in a coagulating bath, on which a plurality of rubber threads may be stored simultaneously; and Figure 5 is a sectional elevation along line 5—5 of Figure 4. Figure 6 illustrates in elevation, with parts in section, another embodiment of the invention which may be used for the continuous manufacture of rubber thread comprising a series of thread-storage devices, certain of which are partly immersed in their respective processing baths; Figure 7 is a plan thereof; Figure 8 shows another embodiment of the invention generally similar to that of Figure 6 comprising a series of thread-storage devices each of which is wholly submerged in its processing bath; Figure 9 is a similar view of still another embodiment of the invention in which processing liquids are showered on the rubber thread while it is stored on a plurality of thread-storage devices; and Figure 10 is a sectional elevation from approximately line 10—10 of Figure 9 of a form of drying and/or vulcanizing apparatus that may be used to advantage in the practice of the invention.

In Figures 1 and 2, the invention is shown as applied to the coagulation of rubber thread in a coagulating bath. The rubber thread 1 may be formed in any desired manner, as by projection of an aqueous dispersion of rubber by means of nozzle 2 into a suitable coagulating bath 3 contained in the trough 4. The coagulant may be any liquid which either simply coagulates the rubber such, for example, as acetic acid, or which effects both osmotic dehydration and setting of the rubber thread, as ammonium acetate. The rubber thread passes from nozzle 2 to a thread-storage, thread-advancing device 5, shown partly immersed in the bath, on which the rubber thread may be continuously stored for a period long enough to attain the desired degree of coagulation, which period is in part determined by the speed at which the rubber thread is projected into the coagulating bath. The rubber thread may be withdrawn from the thread-storage device 5 by any suitable means, as, for example, a subsequent thread-storage device, some form of collecting means, etc. A guide, which may take the form of a roller 6, may be provided to guide the rubber thread from the thread-storage device 5.

The thread-storage device 5 may conveniently take the form of a rotatable reel of the type shown in enlarged section in Figure 3, the same being a modification of the type of reel shown, described and claimed in an application of Walter F. Knebusch, entitled "Winding reel", Serial No. 652,089, filed January 16, 1933 (Patent No. 2,210,-914). On this reel, by the action of the elements of the reel during rotation thereof, the rubber thread may be continuously stored in a plurality of spaced helical turns which are advanced axially of the reel. By suitable construction of the reel, any practicable length of rubber thread may thus be stored thereon in a relatively small space without tangling or other difficulties. While on the reel, one or more processing treatments may be applied to the rubber thread.

The reel illustrated in Figures 1, 2 and 3 comprises two generally cylindrical sets of alternating bars. Reel member 7, which may be termed the concentric member, is mounted with its axis concentric with that of a shaft 9 and is composed of a plurality of longitudinal bars 11 supported by a spider 12. Reel member 8, which may be termed the eccentric member, is mounted with its axis offset and inclined to that of member 7 and is composed of a plurality of bars 13, disposed alternately with those of member 7, supported by the spider 14. The bars in members 7 and 8 are preferably equal in number and should preferably be as numerous as is consistent with the proper construction and operation of the reel. Eccentric member 8 may be rotatably supported in the aforesaid offset and inclined position on member 15 by means of the bushing 16. The reel mechanism may be positively driven by rotation of the shaft 9, which may be journaled in the member 15 and to which concentric member 7 is attached for rotation, as by set screw 17.

Rotation of shaft 9 causes concentric member 7 to rotate, whereupon contact of the bars 11 of this member with bars 13 of the eccentric member 8 causes the latter member to rotate. The offset and inclined relationship of the two cylindrical reel members 7 and 8 causes the thread, as it winds on the reel during rotation thereof, to form a plurality of spaced substantially helical turns which progress axially along the reel, until they are discharged or otherwise taken off the reel, in a manner more fully described in the aforesaid Knebusch application. This reel is open-ended in the sense that one end is free of a projecting driving shaft, which feature provides convenience in threading up or starting the thread on the reel.

Any suitable means of mounting or driving the reel may be provided. In the embodiment shown, the reel mechanism 5 is supported by the housing member 18, which supports boss member 15 and which is fastened, as by bolts 19, to the frame member 21. Member 21 is provided with means, as the lugs 22, for mounting it on the frame 23 of the machine. The reel driving mechanism illustrated consists of a gear 24 mounted to rotate the shaft 9 and meshing with a gear 25 mounted for rotation with shaft 26. The shaft 26 may be journaled in member 21, as shown, and may be driven by gear 27 meshing with a gear 28 mounted on a drive shaft 29 connected to a suitable motor or other source of power (not shown). Bracket 31 may be provided to support the drive shaft 29.

In lieu of the thread-storage, thread-advancing reel 5, other reels of generally similar types may be employed.

The supporting means for the nozzle 2 from which is extended the aqueous dispersion of rubber from which is formed the rubber thread may be of the type illustrated comprising a tube 32, on which the nozzle 2 is mounted, and a bracket 33 by means of which the position of the nozzle 2 may be adjusted in the bath with regard to the reel 5. The aqueous dispersion of rubber may be supplied to the pipe 32 by a hose 34 which may be connected to any suitable supply of the material. Preferably the aqueous dispersion of rubber is supplied under a constant pressure, as, for example, that of a constant head.

Another type of thread-storage device which may be used to advantage in the practice of this invention is that shown in Figures 4 and 5. This thread-storage device, designated 5a, is of sufficient length to permit the storing on its periphery of a plurality of separate rubber threads. The device 5a is shown as disposed in the bath 3 with only the upper portion projecting therefrom. Each rubber thread 1, after having been formed in any suitable manner, as by extrusion from a nozzle 2 into the coagulating bath 3 contained in trough 4, passes to the thread-storage device 5a on which it is continuously stored for a sufficient period, controlled in part by the speed at which the rubber thread is passed through the bath, to obtain the desired degree of coagulation. Each rubber thread 1 is then withdrawn from the device by any suitable means, preferably guided as by rollers 6.

Thread-storage device 5a is shown as a modification of the generally similar reel shown, described and claimed in said application of Walter F. Knebusch. The reel 5a comprises two generally cylindrical sets of bars 7a and 8a, which are supported with their axes in offset and inclined relationship with each other. Member 7a, which may be termed the concentric member because it is mounted with its axis concentric with that of shaft 9a, is composed of a plurality of bars 11a supported on spiders 12a, one at each end of the reel, each of which spiders may be mounted for rotation with the shaft 9a, as by set screws 17a. Member 8a, which may be termed the eccentric member, is supported with its axis offset from and inclined to the axis of shaft 9a, and consequently of member 7a, and is composed of a plurality of bars 13a supported by spiders 14a, one for each end of the reel. Spiders 14a are rotatably supported in the aforesaid offset and inclined relationship on the members 15a, which members 15a are so formed that the axes of the cylinders formed by the surfaces on which the spiders are supported are in the desired offset and inclined relationship with the axes of the shaft 9a. Shaft 9a may be journaled in the member 15a or otherwise supported in the correct position with relation thereto.

The reel 5a is adapted to be positively driven by rotation of the shaft 9a which causes member 7a fixed to it to rotate also. Contact of the bars 11a of this member with the alternately disposed bars 13a of member 8a causes the latter to rotate. This rotation of the reel, in conjunction with the offset and inclined relationship of the axes of the members 7a and 8a, causes the rubber thread to wind on the reel and form a plurality of spaced helical turns, which progress axially of the reel until taken off, in a manner more fully described in the aforesaid Knebusch application. Shaft 9a may be positively driven from one end by some means, such as that shown, which is similar to the driving and mounting means illustrated in the embodiments of Figures 1, 2 and 3. The other end of the shaft 9a is freely rotatably mounted on member 15a of the bracket 35, which may be supported, as shown, by member 36 of the frame of the machine.

In lieu of thread-storage, thread-advancing reel 5a, other reels of generally similar types may be employed.

The thread-storage, thread-advancing reels of the embodiments illustrated in Figures 1 to 5, inclusive, are shown immersed for a greater portion of their diameters. It is obvious that the reels may be either more or less deeply immersed; in fact, they may be either entirely submerged or entirely free of the baths, in which latter case the processing liquid may be showered on the rubber thread from above. The invention contemplates the use of thread-storage, thread-advancing devices, which may take the form of reels of these or similar types, in various other processing treatments, both wet and dry. Other embodiments of the invention will be illustrated and described hereinafter.

Another apparatus embodying the invention is shown in Figures 6 and 7. In this embodiment, the thread proceeds in sequence to each of a series of suitable thread-storage, thread-advancing devices, which may take the form of reels similar to those described, on each of which a suitable processing treatment is applied to the rubber thread. While for convenience five reels are shown, any desired number of processing treatments may be employed. Thus, for instance, the first thread-storage, thread-advancing reel 5 may be used for coagulation of the rubber thread; the following reel 31 may be used for washing of the rubber thread; the next reel 38 may be used for some other liquid processing treatment, as the superficial application of a solution or suspension of a migratory accelerator; the succeeding device 39 may be devoted either to drying or to the first step of a dry vulcanizing process; and the next device 40 to either dry vulcanizing or to the completion of the drying initiated on device 39, the rubber thread 1 finally passing to the suitable collecting device 42.

The rubber thread 1 is shown as being formed by extrusion of a dispersion of rubber, such as latex, from a nozzle 2 into a suitable coagulating bath 3 contained in the trough 4, the incompletely coagulated thread being stored temporarily on the reel 5, disposed at least partly in the coagulating bath. The invention is not restricted, however, to the manufacture of rubber threads formed by extrusion into a coagulating bath: the thread may be formed in any other suitable manner, as by dry spinning, in which case it will not require the use of a coagulating liquid. Each of the reels devoted to the wet processing of the thread; namely, reels 5, 37 and 38, is shown as virtually completely immersed in separate baths of processing liquid. They may, of course, be disposed in any other relationship to these baths. Any suitable means for mounting and driving the reels may be provided, as that shown, which is similar to that of the embodiments of Figures 1 to 5, inclusive. A pipe 43 to supply fresh reagents and a drain pipe 44 to drain the reagent in the trough 4 and keep the bath level constant may be provided for each bath. Each pipe 44 may, if desired, be connected to a sewer, or, in conjunction with its corresponding pipe 43, to a recirculating, makeup, or recovery system.

Chambers 45 and 46, which surround the reels 39 and 40, may be devoted to such dry processing treatments of the rubber thread as drying or vulcanizing by means of suitable gaseous media. The chambers may be of any suitable design, such as those shown. The front wall 47 of chamber 45, together with portions of the side walls 48 and 49, is adapted to be swung up about hinges 51, thus opening the chamber and providing access to the reel 39 for threading up, etc. Suitable slots 52, which may be similar to that shown to better advantage in Figure 10, are provided to permit the side walls to be closed without interference with the rubber thread 1 after it has been started on the reel and is entering and leaving the chamber. The chamber 46 may be of a similar design, except that it may not be necessary to adapt portions of both side walls to be swung open with the front wall if the thread passes out of the chamber through the bottom, as shown. In this case, a slot 53 may be provided in the bottom of the chamber, partially closed by a lip portion 54, extending from the lower end of the cover 47. Suitable means, such as pipes 55 and 56, for supplying and removing the processing medium may be provided for each chamber.

It is desirable to provide suitable guides, such as the freely rotatable rollers 57 and 58 to guide the rubber thread as it leaves each of the preceding reels and starts on the next. With guide rollers of this type positioned as shown the open-ended feature of reels of this type is employed to advantage, since the rubber thread can be started at the rear of each reel, as by roughly winding it around once or twice, after which, by action of the reel elements during rotation, the rubber thread is caused to form spaced helical turns which progress toward the front of the reel where the free end of the rubber thread is discharged or otherwise taken off. The free end may then be readily led around the front of roller 57, diagonally across and around the roll or roller 58, and thence to the next reel where the procedure of starting, etc. may be repeated, and so on until all of the reels in the series have been threaded up. Once the rubber thread has been started, the machine may be run substantially continuously.

All bath troughs and dry processing chambers are, in the embodiment shown, designed to provide sufficient space between the reel and the walls of the trough or chamber for operating convenience. Likewise, the frame 59 of the apparatus may be made of a convenient height for operating purposes. The reels may be adapted to be driven by bevel gears 27 and 28 in the previously described manner, in which case the gears 28 may be mounted on a suitable drive shaft 29 common to all reels. Drive shaft 29 may be driven by any suitable means, as a chain 61 driven by a speed reducer 62 connected to a motor 63.

After being processed on an apparatus embodying the invention, the rubber thread 1 may, depending on its intended use, be passed to suitable braiding or covering machines, where it may be covered with one or more layers of textile thread or fabric for use in textile manufacture, after which it may be collected in any suitable form; or the rubber thread may be passed to other machines which will use it continuously with its production; or the rubber thread may be collected in any suitable way, one of which is shown. In the collecting means shown in connection with the described embodiment, the rubber thread 1 after leaving the last reel passes through guide 64 and is collected on the spool 42 which is rotated at constant peripheral speed by frictional contact with roller 65. Roller 65 may be driven as by belt 66 from the motor 63. A traverse guide 67 which may be actuated from a suitable cam rotated by the roller 65 or by the spool 42, causes the rubber thread 1 to be wound on the spool 42 with any desired lay. In collecting devices of this type, changes in tension of the rubber thread while winding due to the buildup of the thread on the spool are eliminated since the collecting spool 42 is rotated at constant peripheral speed.

An embodiment of the invention in which the reels are entirely submerged in the liquid processing baths is shown in Figure 8. The rubber thread 1 may be produced in any suitable manner, as by the apparatus shown in broken lines, wherein the thread is formed by extrusion from a nozzle 2 into a coagulating bath. The rubber thread may, if desired, be stored temporarily on the reel 5, which may be submerged in a coagulating bath, to allow sufficient period for coagulation of the rubber, after which it passes to the first of a plurality of reels disposed in processing sequence. Three wet processing reels 68, 69 and 70, all completely submerged in the processing baths, are shown for the purpose of illustration. The reels submerged in the bath may be mounted and driven in any suitable manner, as, for instance, that shown in connection with the embodiment of Figures 6 and 7.

Suitable guides, which may take the form of rollers 72, 73, may be provided to aid in the passage of thread from one reel to the succeeding reel. These rollers may be tilted, as shown, to support the rubber thread as it passes over the edges of the troughs, and if open-ended reels disposed in an arrangement similar to that shown in Figure 7 are employed, the guide rollers may be positioned in an offset relation similar to that of Figure 7 to take advantage of the open-ended feature of the reels. The rubber thread 1, after leaving the last wet processing reel of Figure 8, may proceed to any suitable following device, such as a suitable drier or vulcanizing apparatus. In the bath troughs of this embodiment, as in that of Figures 6 and 7, reagent supply and drain pipes 43 and 44 may be supplied for each bath.

It is not necessary that the wet processing reels be submerged or even partly immersed in the bath. In Figure 9 is illustrated another embodiment of the invention in which the processing reagent is applied to the rubber thread on each of the wet processing reels 74 and 75 by means of the reagent distributor 76 supplied by pipe 77. The reagent is thus showered down on the reel below and may be collected in a trough 78 below the reel, from which it may drain as by pipe 79. Partitions 81 between the reels, as well as partitions 82 at the backs of the reels 74 and 75, may be provided to prevent splashing, etc. Of course, any desired number of similar wet processing reels may be used, depending on the treatments that it may be desired to apply to the rubber thread, the two shown here being presented merely for the purpose of illustration.

In this embodiment, the rubber thread 1, which is supplied from any suitable source such as the apparatus shown in broken lines in which the rubber thread 1 is formed by extrusion from a nozzle 2 into a coagulating bath 3 and is thereafter stored for the purpose of coagulation on a reel 5 at least partly immersed in the bath, passes to the reels 74 and 75 on each of which processing treatment is administered by means of reagent showered down to the thread stored thereon. Any desired wet processing treatments may be administered on reels of this type, such, for instance, as washing on reel 74 and the application of a suitable accelerator on reel 75. The thread may subsequently be dried, after which it may be vulcanized in any desired manner or it may be dried on any suitable apparatus. The apparatus illustrated, comprising reel 83 and chamber 46, is adaptable to either drying, vulcanizing, or both.

With this apparatus, shown in larger section in Figure 10, the reel 83 may be of the same type as previously described; that is, composed of two generally cylindrical cage-like sets of bars 7 and 8, which are positioned in an offset and inclined relationship with respect to each other. The reel 83, however, may be modified as shown to permit a gaseous vulcanizing or drying medium to be applied to the rubber thread from the interior of the reel, in which case certain advantages, such as uniformity of treatment of the thread, etc. result. In the embodiment shown in Figure 10, the drive shaft 9b of the reel is made hollow and is supplied as by pipe 84 with the drying or vulcanizing medium. Holes 85 in that portion of the shaft which extends into the interior of the reel provide communication with the interior of the reel. The outer end of the reel 83 may be closed off so as to divert the drying or vulcanizing medium directly to the thread on the reel. This may be accomplished by the cover 86, which is supported by the outer ends of the bars of member 7 and which is held in position by the plug bolt 87 which also closes the end of the hollow drive shaft 9b. The other end of the reel is effectively closed by the spider 14.

The reel may be mounted and driven in any suitable manner. In that shown, for instance, the member 88, on which is journalled eccentric and inclined member 8, is supported by the longitudinal frame members 89. The reel is shown as driven by the gear 91 meshing with gear 92 mounted on a drive shaft 93 extending longitudinally of the series of reels and from which the other reels may be driven in a similar manner. A bracket 94 supporting the drive shaft may be provided for each reel, if desired. A housing member 95 mounted on the member 88 supports the vulcanizing or drying medium supply pipe 84 and provides a journal for the outer end of the hollow drive shaft 9b. A sealing or packing ring 96 may also be provided to prevent escape of the gaseous medium past the shaft 9b.

The chamber 46 which surrounds the reel 83 may be of any suitable design, such as any of those described previously in connection with the embodiments of Figures 6 and 7. This chamber is provided with a hinged front wall or cover 47 which, with portions of one or both of the side walls 48, 49, as is required, is designed to swing about the hinges 51. The side wall or walls through which the rubber thread passes may, as in the case of wall 48, be provided with a suitable curved slot 52 to accommodate the thread. When the cover is swung open, the wall portion 48 swings with it and thus it is a simple matter to thread up the reel contained in the chamber, a guide such as roller 58 being provided to guide the thread on the reel. After the thread has progressed across the reel, the free end is then led out of the chamber, in this case through a slot 53 in the bottom of the chamber. Cover 47 is swung shut, the slot 52 eliminating any interference between the thread 1 and the wall 48 as the latter swings into place. The greater portion of the slot 52 may be closed by an extending portion 97 which also provides strength, while slot 53 in the bottom of the chamber may be closed by the extending portion 54 of the front cover. Latch means 98 may be provided to keep the cover in place. A pipe 56 to allow the gaseous medium to escape from the chamber may also be provided.

While a chamber enclosing the reel may not be necessary for drying or dry vulcanizing, if some medium which is inexpensive or not necessarily desirable to recover, such as heated air, is used, it is often desirable, even with such a medium, to confine the space about the reel as to intensify the action of the drying or vulcanizing medium. With a chamber such, for instance, as that shown enclosing the reel, this effect may be obtained; in addition, recovery of the drying or vulcanizing medium is made possible if desired. Obviously, of course, various other types of chambers or enclosures may be provided to accomplish the same results.

It is desirable to the proper operation of the apparatus to keep the rubber thread or the like under a slight tension as it is being processed. This can be accomplished by increasing the peripheral speeds of subsequent reels over the peripheral speeds of preceding reels, as by changing the ratios of the drive gears or by constructing the reels so that the diameter of the reel increases as the rubber thread or the like progresses across it. The reels may, if desired, be operated so that no tension results. In either case, an advantage is obtained over the ordinary system of manufacturing rubber thread or the like in that the excessive tension caused in ordinary practice by drawing the rubber thread or the like through long baths and/or over numerous supporting guides is entirely eleminated. If a reel of a type similar to those described is used for storing the thread or the like as it is processed, it may not be necessary to provide positive driving means for the reel, since this type of reel can perform its thread-advancing function while being rotated by the thread or the like as it is drawn off the reel.

While the invention has been described in connection with the use of thread-storage, thread-advancing devices of the type of substantially circular reels, it is not limited to this type of thread-storage device. Whereas the thread-storage device described consists broadly of two generally cylindrical members with their axes inclined and slightly offset, it is obvious that the axes of the two cylindrical members may be offset at a considerably greater distance, even at a great enough distance so the peripheries of the two cylindrical members are entirely separated, in which case also a thread-advancing, thread-storage function is performed. The terms "helical," "substantially in the form of a helix," "traveling helix," "advancing helices," etc., which are applied, in the appended claims, to the form in which the rubber thread or the like is stored, are intended to apply to this type of device also. However, a unitary thread-storage, thread-advancing device on which the rubber thread or the like is advanced in substantially the form of a traveling helix is preferable and any device that accomplishes this function may be used in the practice of this invention.

A plurality of threads or thread-like articles can, if desired, be processed on thread-storage, thread-advancing devices of the open-end type herein shown by making suitable modifications in the construction thereof and the apparatus in which the same are employed, but the number of threads or thread-like articles which it is possible to treat on thread-storage, thread-advancing devices of this type is naturally somewhat limited. Likewise, relatively long thread-storage, thread-advancing devices such, for instance, as that shown in Figures 4 and 5 of the present application, may be used, by suitable modification of the apparatus, in any embodiment of the invention or for any processing treatment, in which case several threads arranged as illustrated in Figure 4 may be accommodated simultaneously. If desired, however, a plurality of processing operations may be performed on a single thread or thread-like article on such a thread-storage, thread-advancing device, the thread or thread-like article progressing from treatment zone to treatment zone on the same thread-storage, thread-advancing device without the necessity of conveying it in succession from one thread-storage, thread-advancing device to another.

The invention is applicable to the processing of rubber threads or the like no matter how they are produced, for while it has particular applicability to the processing of rubber thread or the like produced continuously, as by extrusion, it may also be applied to the processing of rubber threads or the like produced by cutting processes. These latter types of rubber threads, which are commonly produced in lengths of approximately 600 feet, may be tied end to end, if desired, and subjected to any suitable processing treatment according to this invention. While the invention may be applied to the processing of rubber threads or the like of large or fine gauge, it is particularly useful in the processing of rubber threads or the like of fine gauge which, because of their delicacy, are difficult to handle. Such, for instance, are the rubber threads used in the manufacture of fabric covered elastic yarns of fine gauge which are used in the textile industry.

Accurate control over the processing treatments administered to the rubber threads or the like is also made possible by the invention. Since a relatively large quantity of thread is stored in a small space, a relatively small amount of reagent is required to be used at one time; wherefore the reagents can easily be controlled as regards such properties as concentration, temperature, etc. For instance, the temperature of a processing bath in which a thread-storage device on which the rubber thread or the like is temporarily stored is at least partly immersed may be readily controlled by means of heating pipes, such as steam pipes immersed in the bath, since the volume of the bath is small and compact. Control over the properties of the dry reagents is also facilitated by this invention.

Since the speed at which the rubber thread or the like is processed is mainly a function of the time during which the thread or the like is to be exposed to the processing treatment, the invention provides means for increasing the speed of processing in that more rubber thread may be exposed to the processing treatment in a given period of time than has heretofore been practicable. This may be accomplished by constructing the thread-storage, thread-advancing device so that a sufficiently large quantity of rubber thread or the like may be stored thereon, or by devoting two or more thread-storage, thread-advancing devices in succession to the same treatment, which can readily be done because of the space saving effected by the invention.

Thus, for instance, in the production of rubber thread or the like by some continuous process, as by the extrusion of latex into the coagulating bath, the rate of coagulation has been a factor in determining the speed of production of the thread. Long coagulating baths have heretofore been required. To prevent the length of the bath from becoming excessive and to prevent excessive stresses in the incompletely coagulated thread or the like due to drawing long lengths through the bath, the thread or the like has usually been drawn through the coagulating bath at the comparatively slow speed of from 30 to 40 feet a minute. With this invention, however, increased speed of production of the thread or the like is practicable, since a greater amount of rubber thread or the like than heretofore conveniently possible may be exposed to the coagulating bath without an increase in tension, either by storing it on one thread-storage, thread-advancing device or on a plurality of such devices, the thread or the like being at least partly immersed in or otherwise subjected to the coagulating liquid.

If one or more devices on which the rubber thread or the like is being coagulated is used, it is possible to subject the thread or the like immediately after forming to the action of a strong coagulating liquid on the first thread-storage device, and to the action of weaker liquids on succeeding thread-storage devices, or vice versa, in which cases beneficial results may be obtained. In a similar manner, a plurality of thread-storage, thread-advancing devices may be devoted to the drying or vulcanizing of the rubber thread or the like, in which latter case, complete continuous vulcanization of the thread may be attained. Because of this control over the various processing treatments made possible by this invention, rubber thread or the like of a superior type may be produced.

As examples of processing treatments which may be applied to the thread or the like according to this invention there have been mentioned coagulation, washing, the application of accelerators, as well as drying and vulcanizing. The vulcanizing may be accomplished by means of gas; for example, ammonia, steam or air, or by a wet method, as by vulcanizing under water, all of which may readily be accomplished by the employment of thread-storage, thread-advancing devices according to this invention. It may be desired to dye the thread or the like by immersion or dipping, which can readily be accomplished. For instance, a commercial dye in an organic solvent, such as benzol, carbon tetrachloride, etc., may be used, an example being 0.1% oil yellow, a mono azo dye, dissolved in naphtha. Likewise it is possible to incorporate in the rubber the leuco base of a vat dyestuff, as by compounding it in the latex if the thread is to be formed therefrom, and to develop the color by exposing the rubber thread or the like to the action of a suitable oxidizing agent while stored on a thread-storage, thread-advancing device according to this invention. The invention is particularly advantageous in performing such processing treatments in that great uniformity in result is obtained because of the aforementioned control over the reagents. Other processing treatments to which the invention is applicable will readily occur to those skilled in the art.

In the specification hereof and in the appended claims, the term "rubber" is intended to include, besides rubber itself, rubber derivatives, such for example, as rubber polymers, rubber isomers, etc.; rubber substitutes; wholly synthetic materials resembling rubber; and rubber-like natural materials, such, for example, as balata, gutta percha and the like. The term "thread or the like" is to be understood to include threads, bands, ribbons, tapes, tubes, and like articles. The term "dispersion of rubber in a liquid vehicle" is intended to include coagulable liquid dispersions of these various rubber materials as for example, natural and artificial latices, other natural and artificial dispersions of these and like rubber materials, and solvent solutions or suspensions thereof, all treated or compounded as desired. Such dispersions may be of normal strength, diluted, concentrated, compounded, or purified, all as known and practiced in the art.

It is intended that the patent shall cover, by suitable expression in the appended claims, whatever features of patentable novelty reside in the invention.

We claim:

1. The process of continuously manufacturing rubber thread or the like comprising the steps of continuously forming the thread or the like by extruding through a spinning nozzle immersed in a coagulating bath a coagulable dispersion of rubber in a liquid vehicle; continuously but temporarily advancing the thread or the like in the form of a traveling helix made up of a large number of closely spaced, generally helical turns, whereby an opportunity is provided for performing a processing operation over a relatively long period of time upon a substantial length of the thread or the like but with the thread or the like meanwhile occupying only a comparatively small space; subjecting the thread or the like in such helical form to the action of a processing medium; and thereafter collecting the processed thread or the like.

2. The process of continuously manufacturing rubber thread or the like defined in claim 1 in which the thread or the like, while being continuously but temporarily advanced in the form of a traveling helix made up of a large number of closely spaced, generally helical turns, is subjected to the action of heat.

3. The process of continuously manufacturing rubber thread or the like defined in claim 1 in which the thread or the like, while being continuously but temporarily advanced in the form of a traveling helix made up of a large number of closely spaced, generally helical turns, is subjected to a vulcanizing operation.

4. The process of continuously manufacturing rubber thread or the like comprising the steps of continuously forming the thread or the like by extruding through a spinning nozzle immersed in a coagulating bath a coagulable dispersion of rubber in a liquid vehicle; continuously but temporarily advancing the partially coagulated thread or the like in the form of a traveling helix made up of a large number of closely spaced, generally helical turns which helix is at least partly immersed in the coagulating bath, whereby the partially coagulated thread or the like is caused to become substantially completely coagulated while supported in such helical form; and thereafter collecting the resulting completely coagulated thread or the like.

5. The process of continuously manufacturing rubber thread or the like comprising the steps of continuously forming the thread or the like by extruding through a spinning nozzle immersed in a coagulating bath a coagulable dispersion of rubber in a liquid vehicle; continuously but temporarily advancing the partially coagulated thread or the like in the form of a traveling helix made up of a large number of closely spaced, generally helical turns, whereby an opportunity is provided for performing a processing operation over a relatively long period of time upon a substantial length of the thread or the like but with the thread or the like meanwhile occupying only a comparatively small space; subjecting the partially coagulated thread or the like to the action of a hardening medium, thereby causing it to set while free from tension imposed by the weight of the thread or the like; and thereafter collecting the thread or the like.

6. The process of continuously manufacturing rubber thread or the like comprising the steps of continuously forming the thread or the like by extruding from a spinning nozzle into an evaporative atmosphere a rubber solvent solution which tends to coagulate in the air; continuously but temporarily advancing the thread or the like in the form of a traveling helix made up of a large number of closely spaced, generally helical turns, whereby an opportunity is provided for performing a processing operation over a relatively long period of time upon a substantial length of the thread or the like but with the thread or the like meanwhile occupying only a comparatively small space; subjecting the thread or the like in such helical form to the action of a processing medium; and thereafter collecting the processed thread.

7. The process of continuously manufacturing rubber thread or the like defined in claim 6 in which the thread or the like, while being continuously but temporarily advanced in the form of a traveling helix made up of a large number of closely spaced, generally helical turns, is subjected to the action of heat.

8. The process of continuously manufacturing rubber thread or the like defined in claim 6 in which the thread or the like, while being continuously but temporarily advanced in the form of a traveling helix made up of a large number of closely spaced, generally helical turns, is subjected to a vulcanizing operation.

9. The process of continuously manufacturing rubber thread or the like comprising the steps of continuously forming the thread or the like by extruding from a spinning nozzle into a coagulant a coagulable dispersion of rubber in a liquid vehicle; continuously but temporarily advancing the thread or the like in the form of a traveling helix made up of a large number of closely spaced, generally helical turns, whereby an opportunity is provided for performing a processing operation over a relatively long period of time upon a substantial length of the thread or the like but with the thread or the like meanwhile occupying only a comparatively small space; subjecting the thread or the like in such helical form to the action of heat; and thereafter collecting the thread or the like.

CHARLES E. HERRSTROM.
FRED J. SAMERDYKE.